United States Patent
Al-Yaseen et al.

(10) Patent No.: US 12,043,810 B2
(45) Date of Patent: Jul. 23, 2024

(54) CONTROL SCHEME FOR AMINE CONTACTOR

(71) Applicant: Saudi Arabian Oil Company, Dhahran (SA)

(72) Inventors: Jafar Al-Yaseen, Dammam (SA); Abdullah Al-Abbad, Al-Ahsa (SA); Osamah Al-Sulaitean, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 72 days.

(21) Appl. No.: 17/544,045

(22) Filed: Dec. 7, 2021

(65) Prior Publication Data

US 2023/0174880 A1 Jun. 8, 2023

(51) Int. Cl.
*B01D 53/14* (2006.01)
*B01D 53/18* (2006.01)
*C10L 3/10* (2006.01)

(52) U.S. Cl.
CPC .......... *C10L 3/105* (2013.01); *B01D 53/1412* (2013.01); *B01D 53/1462* (2013.01); *B01D 53/1493* (2013.01); *B01D 53/18* (2013.01); *B01D 2252/2023* (2013.01); *C10L 2290/542* (2013.01)

(58) Field of Classification Search
CPC ................ B01D 53/14; B01D 53/1412; B01D 53/1462; B01D 53/18; C10L 3/10; C10L 3/105
See application file for complete search history.

(56) References Cited

U.S. PATENT DOCUMENTS

| 4,208,541 A | 6/1980 | McClure |
| 9,440,895 B2 | 9/2016 | Arluck et al. |
| 10,456,749 B2 | 10/2019 | Handagama et al. |
| 2014/0128656 A1* | 5/2014 | Arluck ...................... C07C 7/11 422/111 |
| 2016/0045841 A1 | 2/2016 | Kaplan et al. |
| 2018/0071674 A1 | 3/2018 | Freeman et al. |

FOREIGN PATENT DOCUMENTS

| GB | 2102019 | 1/1983 |
| KR | 100969174 | 7/2010 |
| RU | 2343525 | 1/2019 |
| WO | WO-2022165451 A1 * | 8/2022 |

OTHER PUBLICATIONS

Abdulrahman et al., "Reducing and Controlling the Hydrocarbon Emissions from Rich Amine Regenerator Units in the Natural Gas Sweetening Process: a Case Study and Simulation," Int. J. of Engr. and Adv. Tech. Studies, Jun. 2015, 3(2):17-25.
Al-Zahrani et al., "Methodology of Mitigating Corrosion Mechanisms in Amine Gas Treating Units," Paper 06641, Corrosion NACExpo, 2006, 12 pages.
Cummings et al., "Advances in amine reclaiming—why there's no excuse to operate a dirty amine system," presented at Laurence Reid Gas Conditioning Conference, Feb. 27, 2007, 19 pages.
Angaji et al., "Study and examining the processing—parameters on function of MDEA and DEA solvents for measuring removal units of $CO_2$ and $H_2S$," European Journal of Experimental Biology, Mar. 2013, 3(3):609-616, 8 pages.
SAIP Examination Report in Saudi Arabian Appln. No. 122440757, Apr. 15, 2024, 9 pages (with English translation).

* cited by examiner

*Primary Examiner* — Sharon Pregler
(74) *Attorney, Agent, or Firm* — Fish & Richardson P.C.

(57) ABSTRACT

Systems and methods for controlling an amine contactor are provided. An exemplary method includes determining a pickup ratio for a solvent in the contactor, measuring a temperature of a lower tray of the contactor, adjusting the pickup ratio based, at least in part, on the temperature, and adjusting a flow rate for an injection of lean solvent into the contactor based, at least in part, on the pickup ratio.

9 Claims, 10 Drawing Sheets

CONTROL SCHEME FOR AMINE CONTACTOR

TECHNICAL FIELD

The present disclosure relates to gas plants that are used for the production of natural gas liquids.

BACKGROUND

The processing of natural gas to prepare for pipeline sales or liquefaction involves a number of separations to isolate methane from other components or contaminants, such as crude oil, liquid water, water vapor, carbon dioxide, hydrogen sulfide, and other hydrocarbons. The separation of liquid water may be performed by a settling tank. The initial separation from crude oil, condensates, or both, if needed, may be performed by flashing or distillation. Other contaminants, including mercury and chlorides, among others, may be removed by techniques known in the art, such as wash columns.

Removal of acid gases, such as carbon dioxide, hydrogen sulfide, and others, is termed sweetening. Sweetening may be performed by passing the natural gas through an adsorption column, such as an amine absorber, to remove the acid gases from the natural gas. In an amine absorber, a lean solvent is often passed through the gas flow and a countercurrent contactor. As the lean solvent passes through the gas flow, it absorbs contaminants, such as carbon dioxide or hydrogen sulfide, becoming what is termed a rich solvent. The rich solvent is flowed to a stripper column, wherein the acid gases are stripped from the rich solvent, regenerating the lean solvent.

SUMMARY

An embodiment described in examples herein provides a method for controlling a contactor. The method includes determining a pickup ratio for a solvent in the contactor, measuring a temperature of a lower tray of the contactor, adjusting the pickup ratio based, at least in part, on the temperature, and adjusting a flow rate for an injection of lean solvent into the contactor based, at least in part, on the pickup ratio.

Another embodiment described herein provides a control system for operating a contactor for an amine stripper in a natural gas liquids (NGL) plant. The control system includes a temperature sensor to measure a temperature of a lower tray in the contactor, a flow sensor to measure a flow rate of a sour gas feed stream, an acid gas analyzer on the sour gas feed stream, and a proportional-integral-derivative (PID) flow controller on a lean solvent stream to the contactor. The control system also includes a controller, that includes a sensor interface to obtain measurements from the flow sensor and the acid gas analyzer on the sour gas feed stream. The controller also includes a controller interface to communicate set points to the PID flow controller on the lean solvent stream to the contactor. The controller also includes a processor configured to execute stored instructions and a data store. The data store includes instructions configured to direct the processor to read measurements from the temperature sensor, the flow sensor, and the acid gas analyzer on the sour gas feed stream. The data store also includes instructions configured to direct the processor to calculate a pickup ratio for the amine in the amine stripper, adjust the pickup ratio based, at least in part, on the temperature measured for the lower tray, and generate a set point for the PID flow controller on the lean solvent stream to the contactor, based, at least in part, on the pickup ratio.

Another embodiment described herein provides a natural gas liquids (NGL) plant. The NGL plant includes an amine adsorption system, including a contactor to remove acid gases from a sour gas feed, and a stripper to remove acid gases from a rich solvent from the contactor to form a lean solvent. The NGL plant also includes a lean solvent line from the stripper to the contactor, a flow control valve on the lean solvent line, and a PID flow controller to control the flow control valve. The NGL plant also includes a temperature sensor to measure a temperature of a lower tray in the contactor, a flow sensor to measure a flow rate of a sour gas feed stream to the contactor, and an acid gas analyzer on the sour gas feed stream to the contactor. The NGL plant also includes a controller, that includes a sensor interface to obtain measurements from the flow sensor and the acid gas analyzer on the sour gas feed stream. The controller also includes a controller interface to communicate set points to the PID flow controller on the lean solvent stream to the contactor, a processor configured to execute stored instructions, and a data store, including instructions configured to direct the processor to read measurements from the temperature sensor, the flow sensor, and the acid gas analyzer on the sour gas feed stream. The data store also includes instructions configured to direct the processor to calculate a pickup ratio for the amine in the amine stripper, adjust the pickup ratio based, at least in part, on the temperature measured for the lower tray, and generate a set point for the PID flow controller on the lean solvent stream to the contactor, based, at least in part, on the pickup ratio.

DETAILED DESCRIPTION

Examples described herein provide a new advance control scheme for the contactor of a gas-treating unit. The control scheme reacts proactively to control the pickup ratio and tray 6 temperature of the contactor. The pickup ratio is measured in pounds-mole of acid gas absorbed per pound mole of solvent. The pickup ratio indicates the volume of acid gases, such as hydrogen sulfide and carbon dioxide, that are being absorbed (picked up), by the solvent. The pickup ratio generally needs to be sustained in a range of about 0.3 to about 0.4 pound-moles of acid gas per pound moles of solvent to ensure an efficient adsorption process, avoid a breakthrough of hydrogen sulfide, and meet the product specifications for sweet gas. The control scheme uses the feed rate, feed gas composition, solvent concentration, and solvent circulation rate as inputs to the control scheme.

As used herein, the solvent may be any solvent that may be used in an amine stripper. While examples are directed to diglycolamine (DGA, aminoethoxyethanol), other solvents that can be used in embodiments are diethanolamine (DEA), methanolamine (MEA), diisopropanolamine (DIPA), among others.

The control scheme is a feedforward/cascade control strategy. The controller measures the acid gas concentration in the feed from the sour gas feed flow meter and the sour gas analyzers, then the flow rate of the solvent to the contactor is gradually changed to maintain the pickup ratio set point. Once the actual pick up ratio deviates from the desired range, for example, crossing the high or low limit, the advance control will gradually increase or decrease the solvent (DGA) flow rate until the desire range of pickup ratio is achieved.

The pickup ratio set point is adjustable based on the temperature of a tray in the contactor, for example, tray 6 near the bottom of the contactor. The tray temperature is divided into 4 different operating zones for controlling. Each temperature zone has an upper and lower set point for pickup ratio. Generally, higher tray temperatures will correspond to a lower set point for the pickup ratio, which is achieved by having the higher solvent flow rate to cool the contactor. In some embodiments, the solvent flow is slowly ramped up (or down) until the pickup ratio setpoint (or limit) is reached. Once the scheme selects the target set point for the pickup ratio, the amine flow rate is adjusted to achieve the pickup ratio set point. Usually, the solvent (DGA) flow will gradually change until it falls between either the upper or lower limits. For example, if the flow change and the pickup ratio falls within the lower limits, then it will maintain the lower limit pick up ratio.

Figure 1:
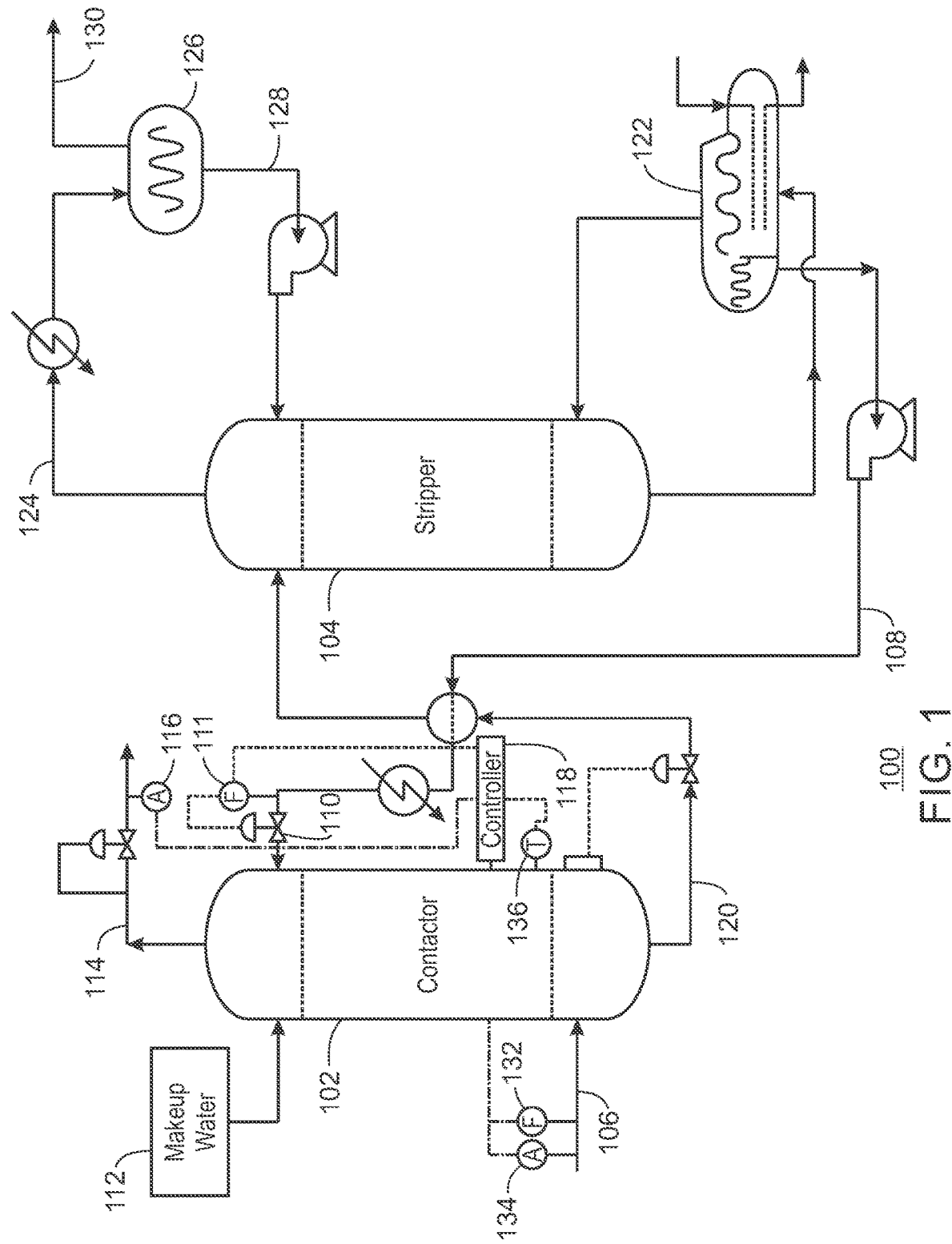
FIG. 1 is a simplified process flow diagram of a contactor and stripper column.

FIG. 1 is a simplified process flow diagram 100 of a contactor 102 and stripper column 104. A sour gas feed 106 is fed to the contactor 102 for sweetening. As used herein, sweetening is the lowering of the concentration of acid gases, such as H2S and CO2, for example, to within specification limits for sales gas. The H2S in sour gas fed is about 2-3 mol. %, and is reduced to below 4 ppm in product sweet gas. For the acid gas, it is usually 10-14 mol. % in the feed. For example, this may be less than 500 ppm acid gas, less than 100 ppm, or less than 50 ppm. In the contactor 102, the sour gas feed 106 rises up through the contactor 102 through a series of trays. In some embodiments, the lowest tray is numbered 1 while the highest tray is numbered 23.

In the contactor 102, a stream of lean solvent 108 is introduced near the top of the contactor 102, for example, at tray 21, through a flow control valve 110. The flow control valve 110 has an associated flow sensor 111 with control circuits to implement a proportional-integral-derivative (PID) control loop for controlling the flow of the lean solvent 108 into the contactor 102.

The solvent is a solution of the amine with water. In this embodiment, the solvent is DGA. As water is lost through the process, more water may be added from a makeup water system 112.

The sweetened gas 114 exits the contactor 102 from the top of the vessel, and flows to a feed gas compressor for pipeline sales, or to a flare header for disposal, for example, depending on the concentration of the acid gases. An outlet gas analyzer 116 may be used to determine the concentration of acid gases in the sweetened gas 114. In some embodiments, the measurements from the acid gas analyzer 116 on the outlet is provided to a controller 118 to assist in determining a set point for the flow rate of the lean solvent 208 added to the contactor 102 through the flow control valve 110. For example, if H2S in the sweet analyzer exceeded 4 ppm (upper limits), the control will take necessary action such as reducing the sour gas feed flow rate or increasing the solvent flow rate.

After the lean solvent 108 passes through the contactor 102 and adsorption acid gases it exits the contactor 102 as a rich solvent 120. The rich solvent 120 is then flow to a stripper column 104 for removal of the acid gases and regeneration of the lean solvent 108. The stripper column 104 is configured as a standard separation column with a reboiler 122 providing heat to the solvent in the bottoms of the stripper column 104. From the top of the stripper column 104, a vapor stream 124 is cooled and passed to a reflux drum 126 for separation of liquids 128, such as the solvent, that are carried overhead. The liquids 128 are pumped back to the stripper column 104 as a reflux stream. The vapor 130 from the reflux drum 126 is an acid gas stream that may be provided to a sulfur plant or disposed of.

The controller 118 uses a number of inputs to calculate a set point for the flow rate of the lean solvent 108 fed to the contactor 102 through the flow control valve 110. For example, the pickup ratio is determined using the unit feed rate, the feed gas composition, strength of the solvent solution, and the solvent circulation rate. The unit feed rate is determined by a flow sensor 132 on the sour gas feed 106 to the contactor 102. The feed gas composition is determined by an acid gas analyzer 134 on the sour gas feed 106. Further inputs to the controller 118 include the strength of the solvent solution and the solvent circulation rate. A temperature sensor 136 on a lower tray in the contactor 102, such as tray 6 counting up from the bottom, is used to provide a temperature measurement to the controller. As discussed below, the tray temperature is used to provide the control points for adjusting the pickup ratio, which is used to adjust the flow of the lean solvent 108 fed to the contactor 102.

Figure 2:
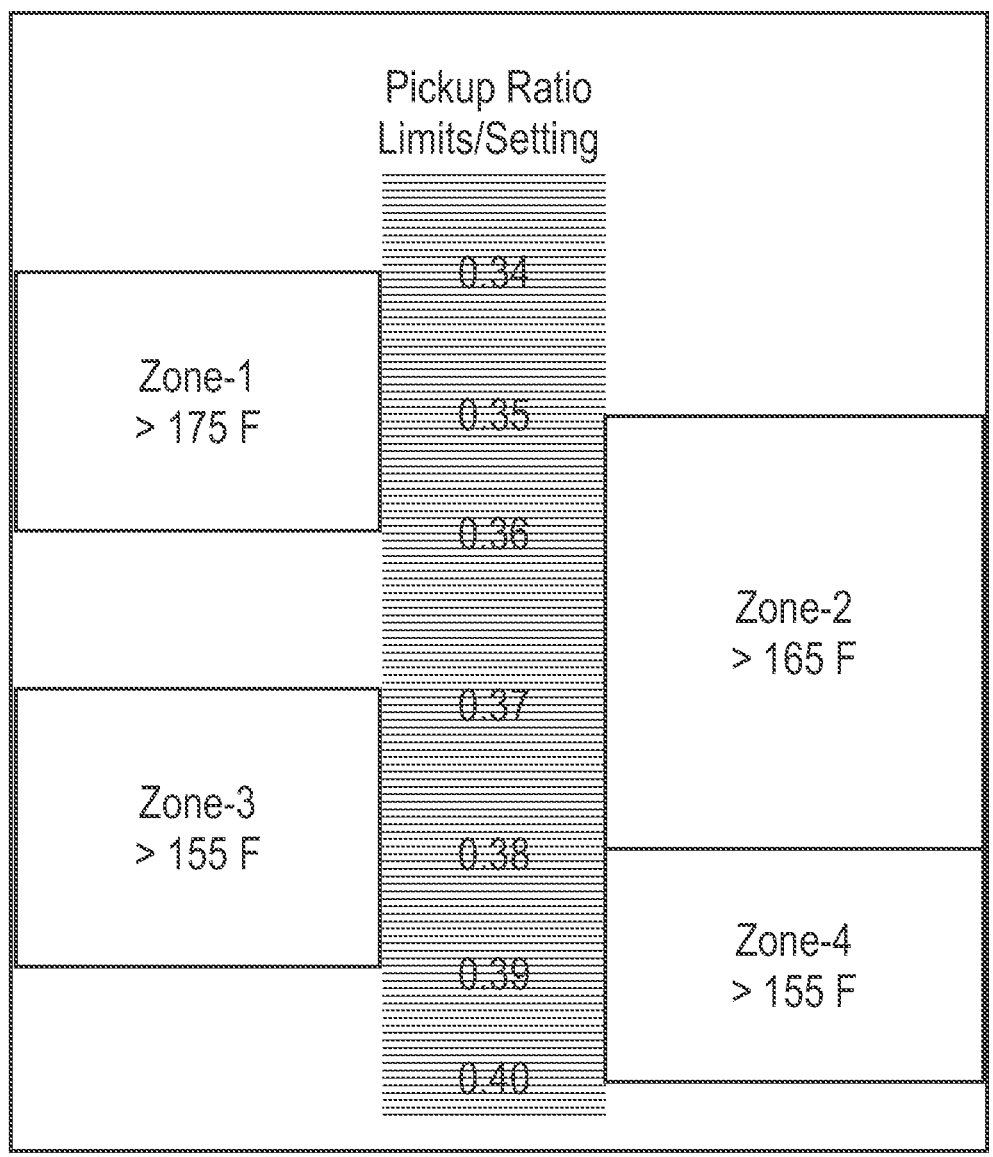
FIG. 2 is a schematic diagram showing the control points of the pickup ratio for four operating zones based on the tray temperature.

FIG. 2 is a schematic diagram showing the control points of the pickup ratio for four operating zones based on the tray temperature. The pickup ratio and tray temperature are important control parameters in the contactor that are used to meet the product specifications for sales gas, maintain equipment integrity, for example, by decreasing corrosion. The tray temperature measurement is divided into 4 zones, zone-1 with a tray temperature of greater than 175° F., zone-2 at a tray temperature greater than 165° F., zone-3 with a tray temperature greater than 155° F., and zone 4 with a tray temperature of less than 155° F.

The pickup ratio (PR) is defined as the moles of acid gas picked up, or absorbed, from the sour gas feed divided by the moles of solvent, such as DGA, as shown in Equations 1 (absolute) and 2 (per hour):

$$PR = moles_{acid\ gas}/moles_{solvent} \qquad \text{Eqn. 1}$$

$$PR = (moles/hour)_{acid\ gas}/(moles/hour)_{solvent} \qquad \text{Eqn. 2}$$

In Equation 2, the rate of moles acid gas adsorbed from the feed, $(mole/hour)_{acid\ gas}$, is calculated as shown in Equation 3:

$$\text{Rate of acid gas absorption (moles/hour)} = \text{gas flow rate (MMSCFD)} \times 1,000,000\ \text{SCF/MMSCF})^* \\ (H_2S\ SCF + CO_2\ SCF)/100\ SCF^*(1\ mole/379 \\ SCF)/24\ hr/day \qquad \text{Eqn. 3}$$

In Equation 2, SCF is standard cubic feet, and MMSCFD is millions of standard cubic feet per day. It can be noted that 1 mole percent (%) of H2S is equal to 1 SCF H2S in the sour gas feed and, similarly, 1 mole % of $CO_2$ is equal to 1 SCF of $CO_2$ in the sour gas feed. The rate of the solvent feed (for DGA), (moles can be calculated as shown in Equation 4:

Mole solvent (mole/hr)=circulation rate US (gpm)*8.34 lb/US gal×1.04 specific gravity*60 min/hr×wt % amine/100/lb/mole amine       Eqn. 4

Figure 3:
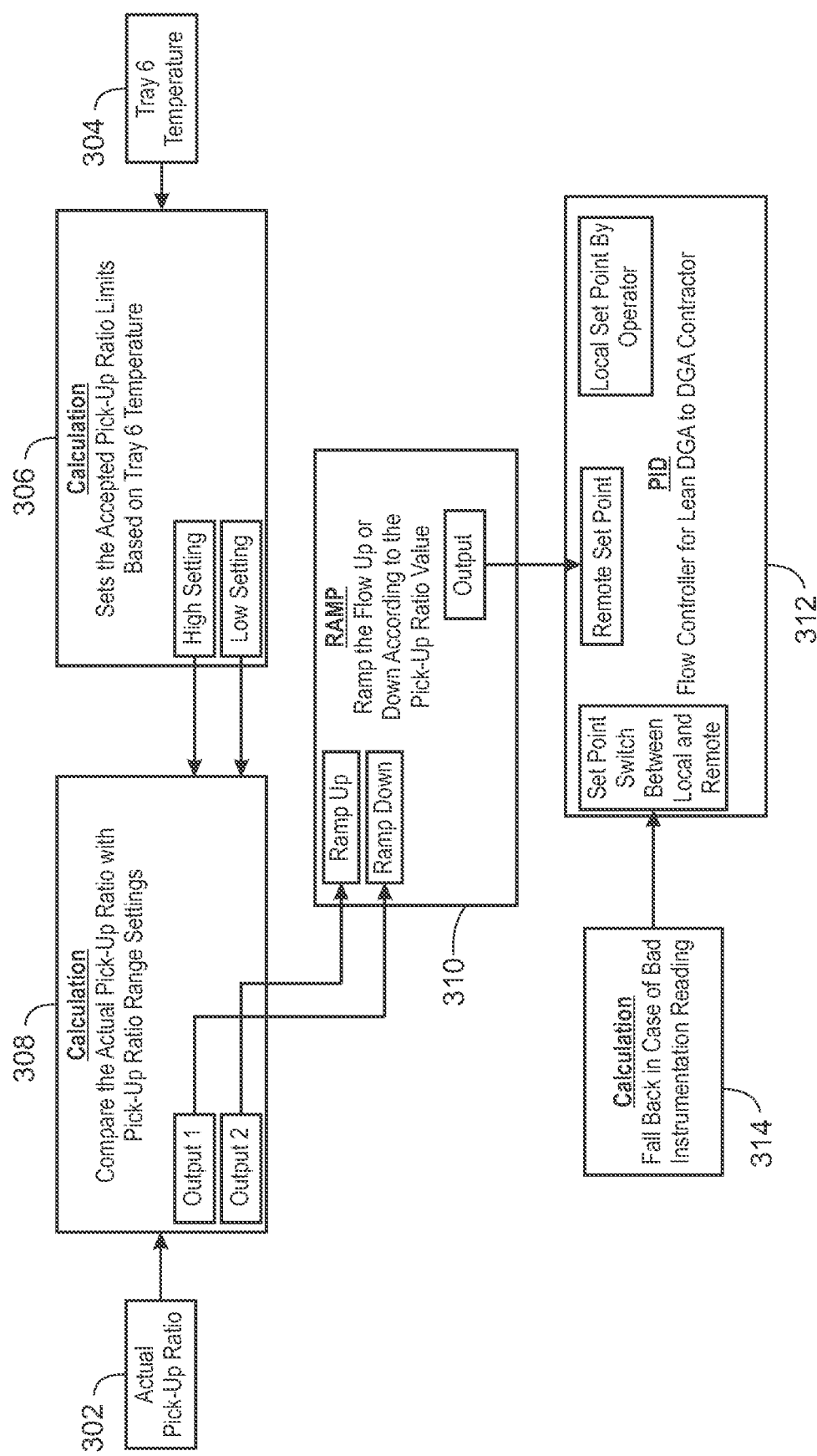
FIG. 3 is a schematic diagram of the control scheme 300 uses the set point ranges of FIG. 2.

FIG. 3 is a schematic diagram of the control scheme 300 uses the set point ranges of FIG. 2. At higher pickup ratios, corresponding to higher temperatures in the column, the amount of lean solvent injected into the column is increased to provide cooling to the column. At lower pickup ratios, the amount of lean solvent injected into the column is decreased, allowing the temperature of the column to rise. For each zone, the calculated value for the pickup ratio is unchanged if it is within the limits of the pickup ratios for the zone. If the calculated pickup ratio is less than or greater than the corresponding limit for the zone, the control will adjust the solvent flow rate until the calculated pickup ratio lands within the corresponding limit for the zone The control scheme 300 begins with the calculation of the actual pickup ratio at block 302, for example, using the equations discussed with respect to FIG. 2. The tray temperature, for example, at tray 6, is measured at block 304. The tray temperature is provided to a calculation block 306 that calculates what the high and low settings for the pickup ratio are for the current temperature zone.

These values are provided, along with the actual pickup ratio calculated at block 302, to a calculation block to determine the flow settings. If the current pickup ratio is within the ranges provided from the calculation block 306, the outputs from block 308 are zero. However, if the actual pickup ratio is above the high setting for the current operating zone, output 2 is a ramp up flag that is provided to a ramp calculation block 310. This instructs the ramp calculation block 310 to increase the set point of the flow rate of the lean solvent fed to the contactor by a target amount. This implements the changes slowly, for example, at a predefined ramp rate, to avoid process upsets. When the solvent is DGA the ramp rate is fixed at about 50 gal. per min. (GPM). For example, this avoids sudden changes when moving from one operating zone to another as the rate of change is controlled during the change of the limits on the pickup ratio. If the actual pickup range is less than the low setting for the current operating zone, output 1 is a ramp down flag that instructs the ramp calculation block 310 to decrease the set point of the flow rate of the lean solvent fed to the contactor by a target amount.

The ramp calculation block 310 takes the current set point of the flow controller 312 and, based on the presence of a ramp up or ramp down flag, adjusts the set point of the flow controller 312. The adjusted set point is then provided as an output to the flow controller, which is used as a remote set point.

The flow controller 312 allows for a local set point on the flow rate to be entered by an operator, for example, to override the value entered as a remote set point from the ramp calculation block 310. This may be used if an instrument failure leads to incorrect values being used to calculate the actual pickup ratio or entered for the tray temperature.

A remote calculation block 314 can be used to provide values for either the operator to enter as a local set point, or as a secondary remote set point. The remote calculation block 314 may use theoretical calculations, or may use the other operational instrument values to estimate the pickup ratio. For example, in some embodiments, if the acid gas analyzer 134 on the sour gas feed fails, an acid gas analyzer 116 on the sweetened gas 114 is used for process control. In various embodiments, the instrumentation includes the solvent flow, sour feed gas, tray 6 temperature, solvent temperature, and the sour gas pressure, among others.

Figure 4:
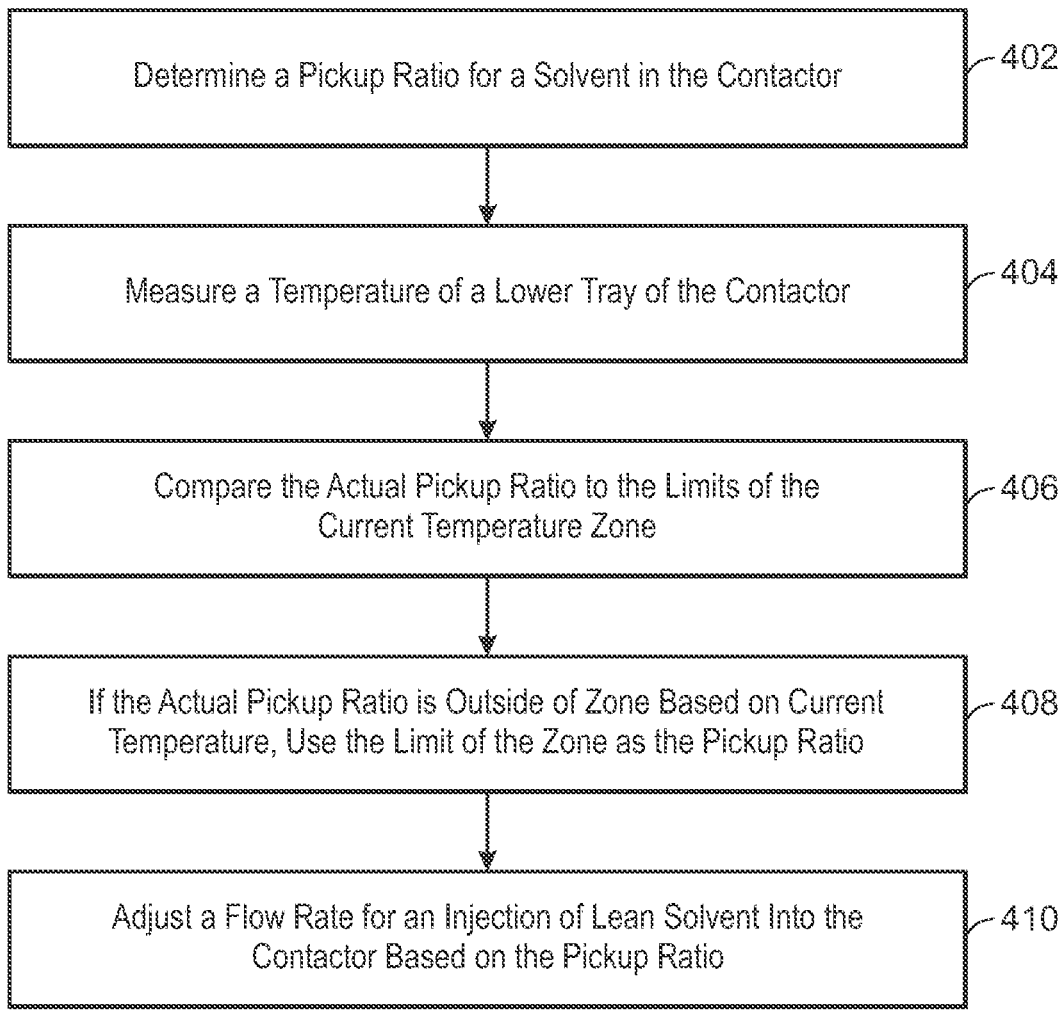
FIG. 4 is a process flow diagram of a method 400 for operating a contactor column to increase the amount of acid gases removed.

FIG. 4 is a process flow diagram of a method 400 for operating a contactor column to increase the amount of acid gases removed. The method begins at block 402, with a determination of a pickup ratio for the solvent in the contactor. At block 404, a temperature is measured for a lower tray, such as tray 6, in the contactor. At block 406, the calculated pickup ratio is compared to the limits for the zone defined by current temperature. At block 408, if the pickup ratio is outside the limits of the zone for the current temperature the corresponding limit is used for control adjustments. For example, if the calculated pickup ratio is greater than the high limit for the zone defined by the current temperature, the high limit will be used for control adjustments. Similarly, if the pickup ratio is lower than the lower limit for the zone defined by the current temperature, the lower limit will be used for control adjustments. At block 410, the flow rate for the injection of lean solvent into the contactor is adjusted based on the pickup ratio.

Figure 5:
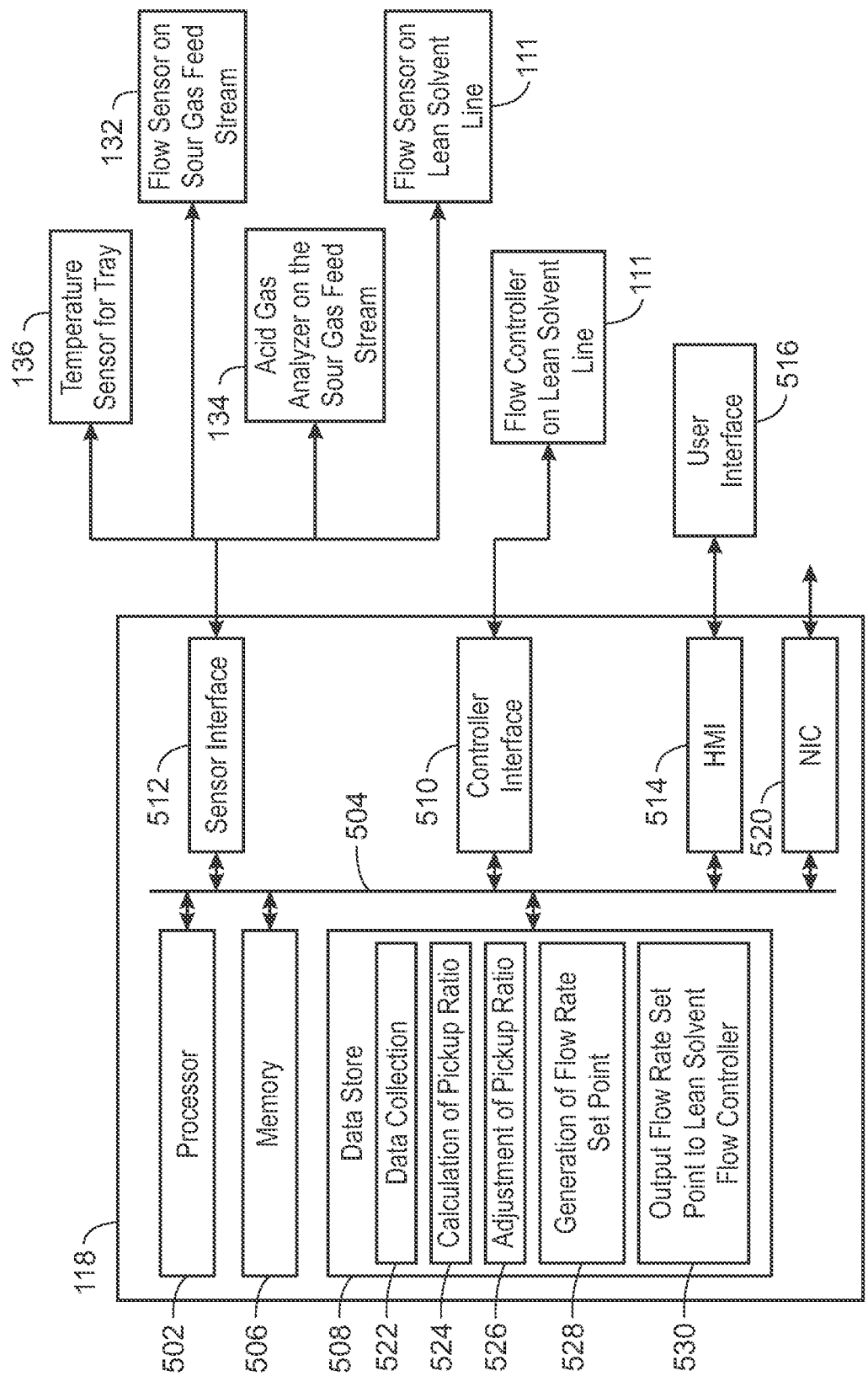
FIG. 5 is a block diagram of a controller 118 for controlling feed rate of lean solvent to the contactor.

FIG. 5 is a block diagram of a controller 118 for controlling feed rate of lean solvent to the contactor. Like numbered items are as described with respect to FIG. 1. The controller 118 may be used to provide more robust process control and higher efficiency.

In some embodiments, the controller 118 may be a separate unit mounted in the field or plant, such as a programmable logic controller (PLC), for example, as part of a supervisory control and data acquisition (SCADA) or Fieldbus network. In other embodiments, the controller 118 may interface to a distributed control system (DCS) installed in a central control center. In still other embodiments, the controller 118 may be a virtual controller running on a processor in a DCS, on a virtual processor in a cloud server, or using other real or virtual processors.

The controller 118 includes a processor 502. The processor 502 may be a microprocessor, a multi-core processor, a multithreaded processor, an ultra-low-voltage processor, an embedded processor, or a virtual processor. The processor 502 may be part of a system-on-a-chip (SoC) in which the processor 502 and other components are formed into a single integrated package. In various embodiments, the processor may include processors from Intel® Corporation of Santa Clara, California, from Advanced Micro Devices, Inc. (AMD) of Sunnyvale, California, or from ARM holdings, LTD., of Cambridge England. Any number of other processors from other suppliers may also be used.

The processor 502 may communicate with other components of the controller 118 over a bus 504. The bus 504 may include any number of technologies, such as industry standard architecture (ISA), extended ISA (EISA), peripheral component interconnect (PCI), peripheral component interconnect extended (PCIx), PCI express (PCIe), or any number of other technologies. The bus 504 may be a proprietary bus, for example, used in an SoC based system. Other bus technologies may be used, in addition to, or instead of, the technologies above. For example, plant interface systems may include I2C buses, serial peripheral interface (SPI) buses, Fieldbus, and the like.

The bus 504 may couple the processor 502 to a memory 506. In some embodiments, such as in PLCs and other process control units, the memory 506 is integrated with a data store 508 used for long-term storage of programs and data. The memory 506 include any number of volatile and nonvolatile memory devices, such as volatile random-access memory (RAM), static random-access memory (SRAM), flash memory, and the like. In smaller devices, such as PLCs, the memory 506 may include registers associated with the processor itself. The data store 508 is used for the persistent storage of information, such as data, applications, operating systems, and so forth. The data store 508 may be a non-volatile RAM, a solid-state disk drive, or a flash drive, among others. In some embodiments, the data store 508 will include a hard disk drive, such as a micro hard disk drive, a regular hard disk drive, or an array of hard disk drives, for example, associated with a DCS or a cloud server.

The bus 504 couples the controller 118 to a controller interface 510. The controller interface 510 may be an interface to a plant bus, such as a Fieldbus, an I2C bus, an SPI bus, and the like. The controller interface 510 couples the controller 118 to the flow controller of the flow sensor 111 on the lean solvent line to the contactor. Although shown as part of the flow transmitter, it may be understood that the flow controller may be an independent code block in the controller, or a separate control block in a DCS.

A sensor interface 512 couples the controller 118 to the temperature sensor 136 for a lower tray in the contactor, such as tray 6. The sensor interface 512 may be an interface to a plant bus, such as a Fieldbus, an I2C bus, an SPI bus, and the like. The sensor interface 512 also couples the controller 118 to the flow sensor 132 on the sour gas feed stream, the acid gas analyzer 134 on the sour gas feed stream, and the flow sensor 111 on the lean solvent line. If present, the sensor interface 512 may also couple the controller 118 to an acid gas analyzer 116 on the sweet gas outlet stream from the contactor.

If the controller 118 is located in the field, a local human machine interface (HMI) 514 may be used to input control parameters. The local HMI 514 may be coupled to a user interface 516, including, for example, a display that includes a multiline LCD display, or a display screen, among others. The user interface 516 may also include a keypad for the entry of control parameters, such as the starting parameters for the flow of the lean solvent into the contactor. Generally, the controller 118 will either be part of a plant control system, such as a DCS, or coupled through a plant bus system to the plant control system.

In some embodiments, the controller 118 is linked to the plant control system through a network interface controller (NIC) 520. The NIC 520 can be an Ethernet interface, a wireless network interface, or a plant bus interface, such as Fieldbus.

The data store 508 includes blocks of stored instructions that, when executed, direct the processor 502 to implement the control functions for the contactor. The data store 508 includes a block 522 of instructions to direct the processor to collect data from the sensors through the sensor interface 512, for example, including the temperature of the lower tray (tray 6), the flow rate of the sour gas feed stream, the concentration of the acid gases in the sour gas feed stream, and the flow rate of the lean solvent into the contactor.

The data store 508 also includes a block 524 of instructions to direct the processor to calculate the pickup ratio. For example, this may be performed using the techniques described with respect to FIG. 2.

The data store 508 includes a block 526 of instructions to direct the processor to compare the calculated pickup ratio to the limits for the temperature zone based on the temperature of the lower tray. If outside the limits for the current temperature zone, the pickup ratio is adjusted to the relevant limit, for example, set to the upper limit of the pickup ratio if above the upper limit for the current temperature zone or set to the lower limit of the pickup ratio if below the lower limit for the current temperature zone.

A block 528 of instructions may be included in the data store 508 to direct the processor to adjust the set point of the flow rate for the lean solvent feed to the contactor. In various embodiments, this is performed by setting a flag to indicate that the flow rate should be ramped up or a different flag to indicate that the flow rate should be ramped down. The ramping of the flow rate is performed by incrementing or decremented the current set point to generate a new set point.

The data store 508 includes a block 530 of instructions to direct the processor to output the flow rate set point to the lean solvent flow controller. In some embodiments, the controller 118 includes instructions to directly control the flow control valve 110, for example, integrating a PID controller into the controller 118. In some embodiments, the controller 118 sends the set point to a flow controller 111 that monitors the flow rate and adjust the flow control valve 110.

Any number of other blocks may be included in the data store 508 to implement other functions, including blocks of instructions to direct the processor to measure the acid gas concentrations in the sweetened gas 114 using an acid gas analyzer 116 on the outlet from the contactor 102.

EXAMPLES

The techniques described herein proactively set proper limits for the pickup ratio set point based on actual feed rate quantity, composition, amine solution concentration, and additionally link them to tray temperature control. The operating changes described herein were tested to determine the effects on operations and product purity as described with respect to FIGS. 7 to 10.

Figure 6:
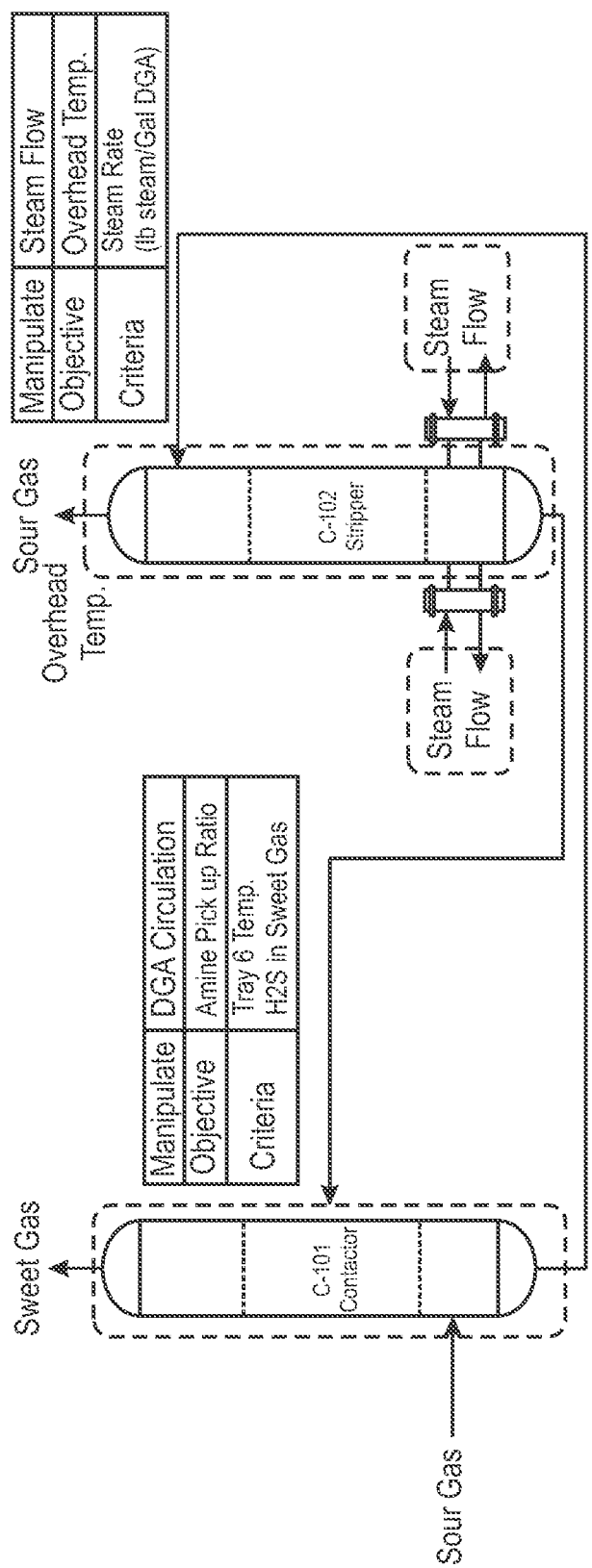
FIG. 6 is a diagram of an operating screen illustrating the control points for controlling the amine stripper.

FIG. 6 is a diagram of an operating screen illustrating the control points for controlling the amine stripper. As shown in FIG. 6, the contactor is controlled by manipulating the solvent circulation rate, for example, the DGA circulation. The primary criterion used is the temperature of a lower tray in the contactor, for example, tray 6, and the amount of $H_2S$ in the sour gas.

The plots shown in FIGS. 7 through 10 are examples of process data for the pickup ratio against the sour gas feed, acid gas content, tray 6 temperature, and DGA circulation rate. The trends show that the pickup ratio changes if there is any change in the sour gas feed or its composition, for example, due to changes in $H_2S$ and $CO_2$ concentration. Accordingly, the DGA circulation rate is adjusting as well.

Figure 7:
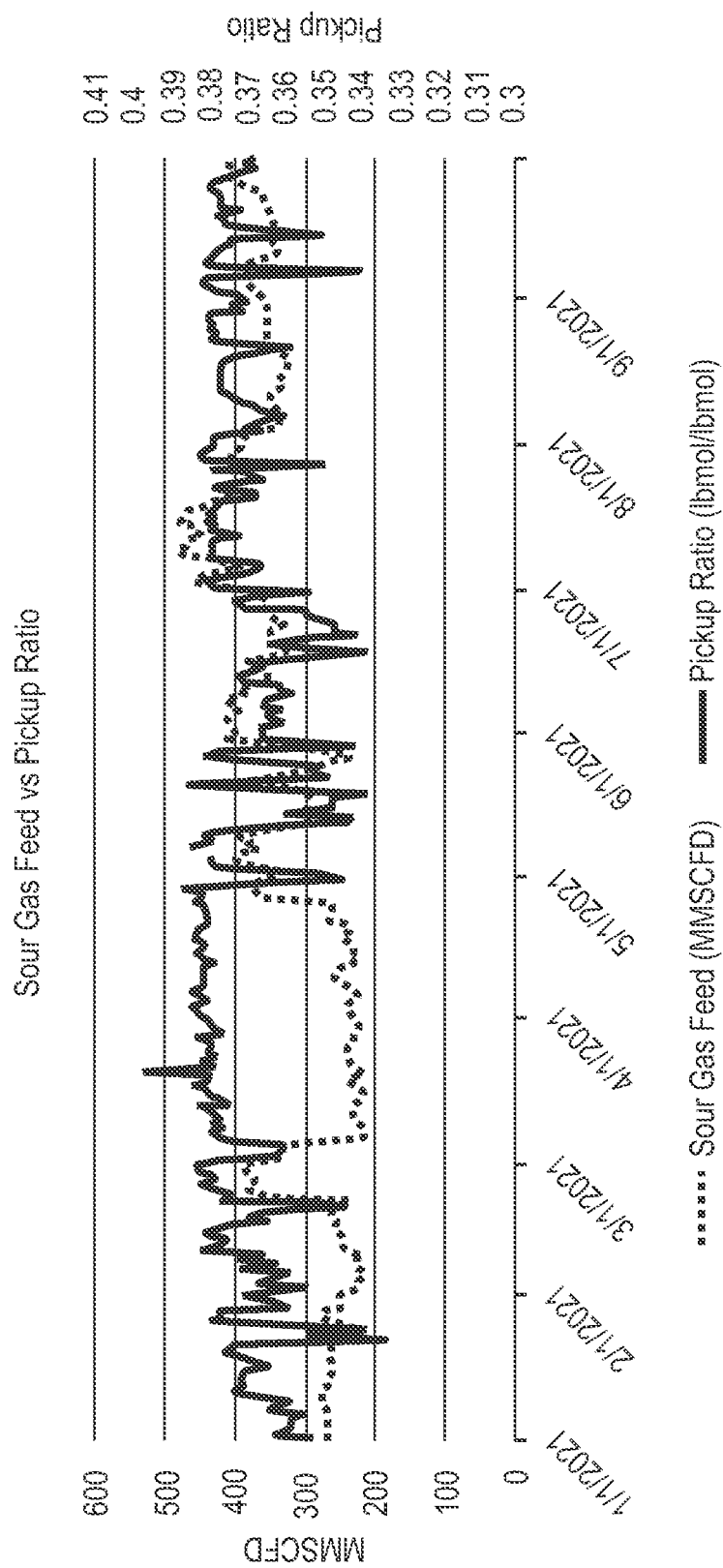
FIG. 7 is a plot of the sour gas feed versus the pickup ratio.

FIG. 7 is a plot of the sour gas feed versus the pickup ratio. As can be seen in this plot, a lower sour gas feed rate results in a higher pickup ratio. FIG. 7 shows that even though the sour gas feed is changing frequently, the pickup ratio is maintained between about 0.34 and about 0.39, which correspond to the upper and lower limits of the pickup ratio, respectively. Usually, higher sour gas feed means higher pickup ratio is not adjusted manually by operator.

Figure 8:
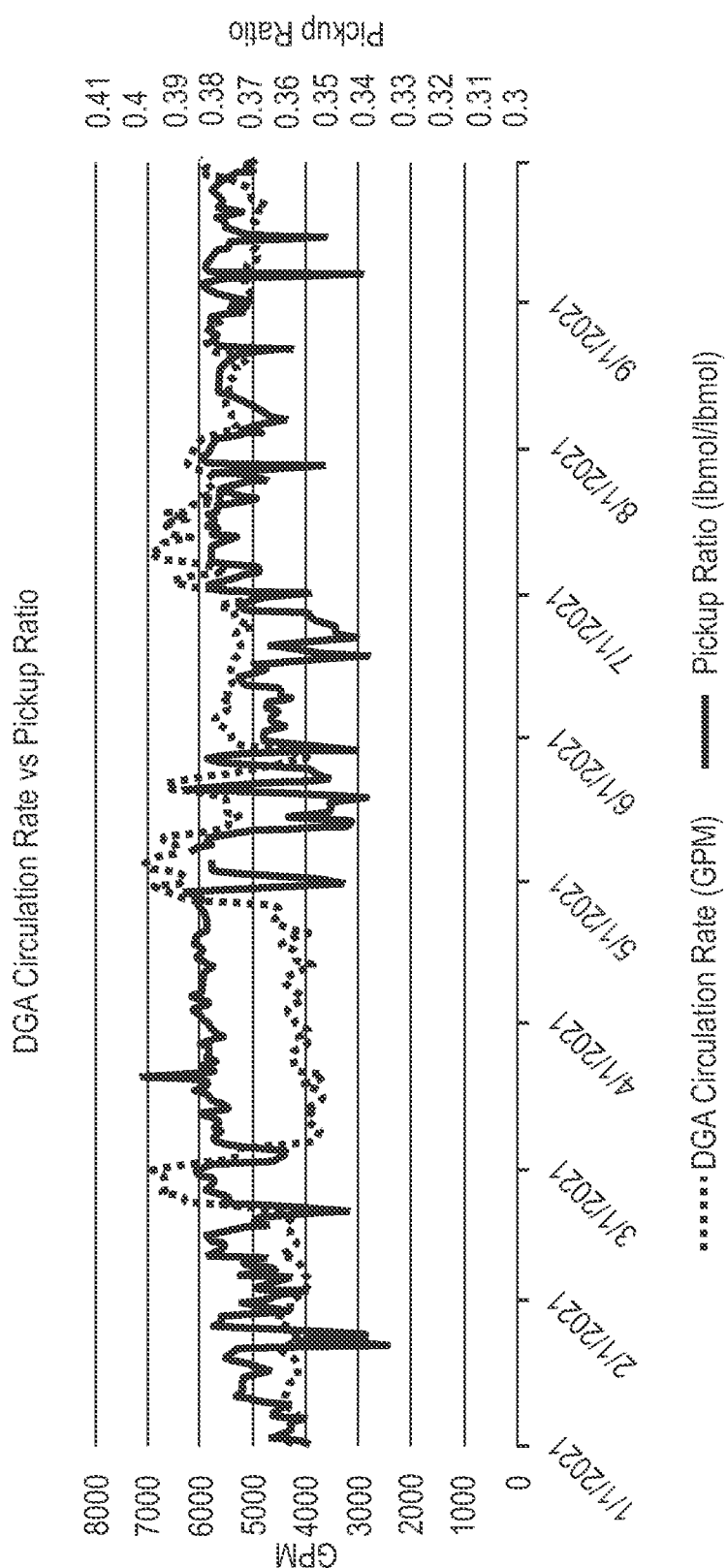
FIG. 8 is a plot of the solvent circulation rate versus the pickup ratio.

FIG. 8 is a plot of the solvent circulation rate versus the pickup ratio. As can be seen in this plot, a lower DGA circulation rate (solvent circulation rate) can correspond to a higher pickup rate. However, balancing the two rates, as shown in the later data, is desirable.

Figure 9:
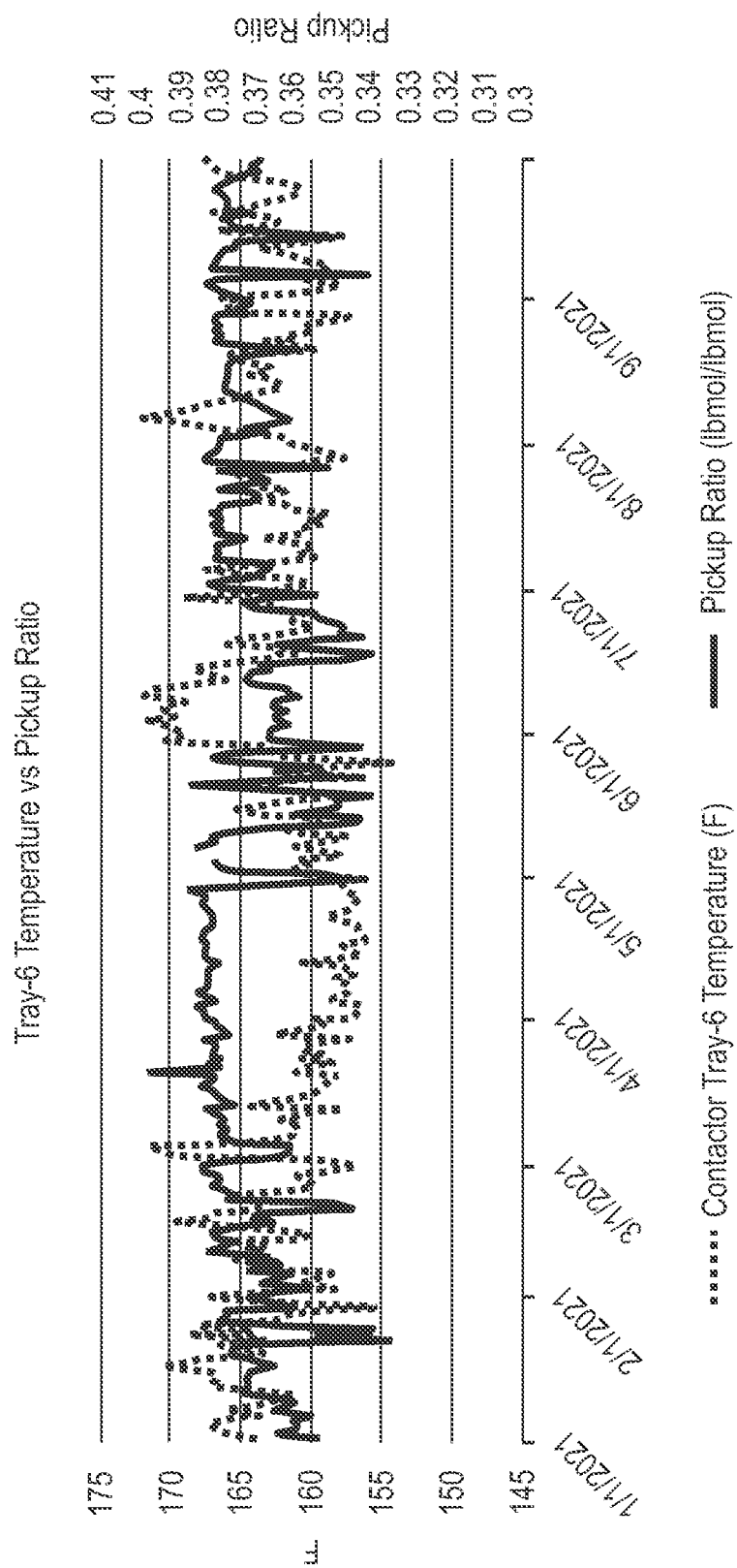
FIG. 9 is a plot of the tray six temperature versus the pickup ratio.

FIG. 9 is a plot of the tray six temperature versus the pickup ratio. As can be seen in this plot, the temperature of tray-6 is inversely related to the pickup ratio.

Figure 10:
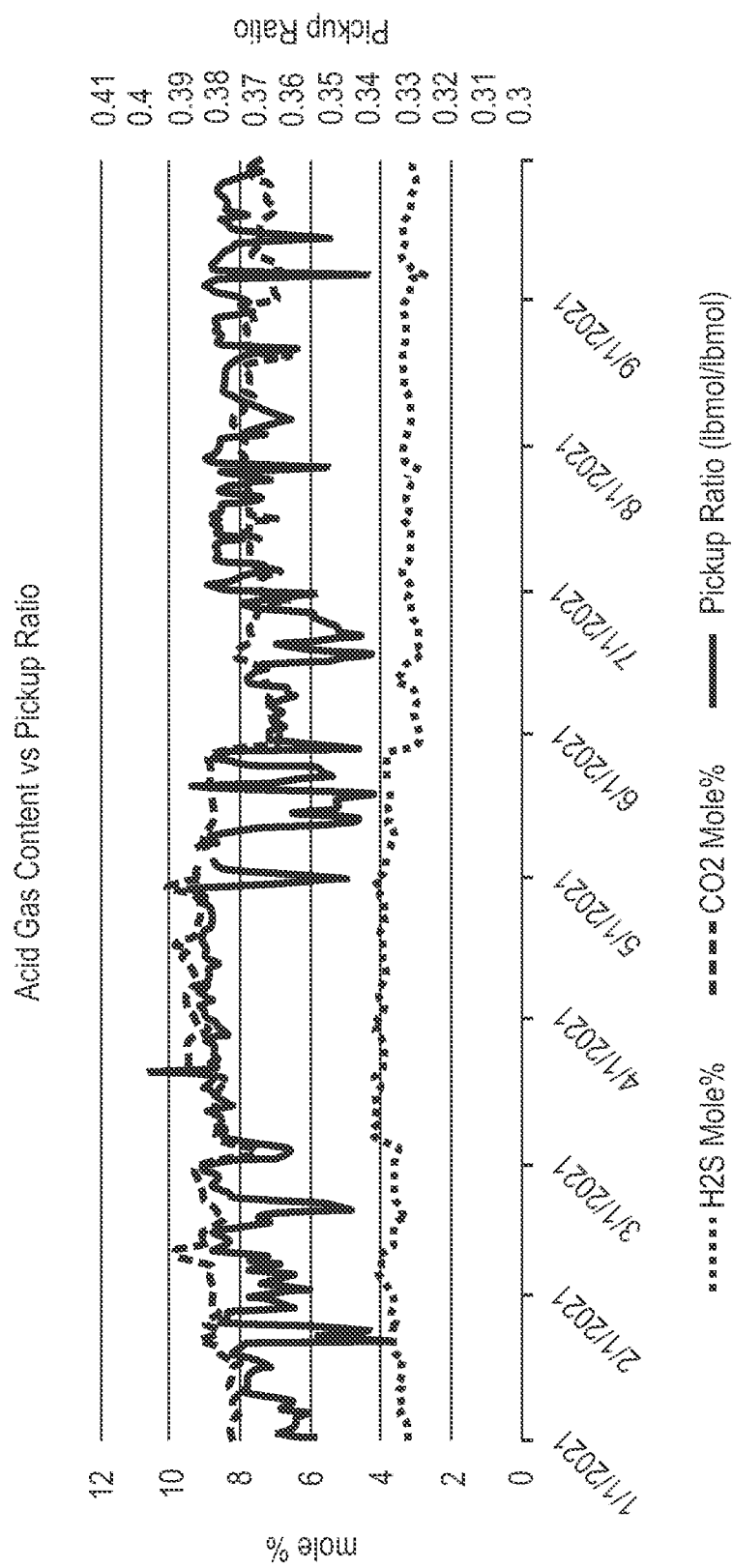
FIG. 10 is a plot of the acid gas content versus the pickup ratio.

FIG. 10 is a plot of the acid gas content versus the pickup ratio. It shows the relationship between the acid gas contents in the feed sour gas and the calculated pickup ratio Embodiments An embodiment described in examples herein provides a method for controlling a contactor. The method includes determining a pickup ratio for a solvent in the contactor, measuring a temperature of a lower tray of the contactor, adjusting the pickup ratio based, at least in part, on the temperature, and adjusting a flow rate for an injection of lean solvent into the contactor based, at least in part, on the pickup ratio.

In an aspect, the method includes measuring a concentration of acid gas at an inlet to the gas contactor and measuring the concentration of the acid gas at an outlet from the contactor.

In an aspect, the method includes defining four operating regions for the temperature and adjusting the pickup ratio based on the limits of the operating region. In an aspect, the method includes defining the four operating regions to be at a temperature of less than 155° F., at a temperature greater than 155° F., at a temperature of greater than 160° F., and at a temperature of greater than 175° F. In an aspect, the method includes setting the pickup ratio to a limiting value of the operating region if the temperature is outside of an operating region. In an aspect, the method includes ramping the flow rate to a new set point at a rate of 50 gallon per minute.

In an aspect, the method includes providing the new set point to a proportional-integral-derivative (PID) controller for the flow rate for the injection of lean solvent. In an aspect, the method includes determining that an instrument is providing faulty readings and calculating a predicted set point for the flow rate based, at least in part, on operational instrumentation.

In an aspect, the method includes switching between a local set point and a remote set point based, at least in part, on a detection of instrument failures.

Another embodiment described herein provides a control system for operating a contactor for an amine stripper in a natural gas liquids (NGL) plant. The control system includes a temperature sensor to measure a temperature of a lower tray in the contactor, a flow sensor to measure a flow rate of a sour gas feed stream, an acid gas analyzer on the sour gas feed stream, and a proportional-integral-derivative (PID) flow controller on a lean solvent stream to the contactor. The control system also includes a controller, that includes a sensor interface to obtain measurements from the flow sensor and the acid gas analyzer on the sour gas feed stream. The controller also includes a controller interface to communicate set points to the PID flow controller on the lean solvent stream to the contactor. The controller also includes a processor configured to execute stored instructions; and a data store. The data store includes instructions configured to direct the processor to read measurements from the temperature sensor, the flow sensor, and the acid gas analyzer on the sour gas feed stream. The data store also includes instructions configured to direct the processor to calculate a pickup ratio for the amine in the amine stripper, adjust the pickup ratio based, at least in part, on the temperature measured for the lower tray, and generate a set point for the PID flow controller on the lean solvent stream to the contactor, based, at least in part, on the pickup ratio.

In an aspect, the data store includes instructions configured to direct the processor to compare the temperature measured for tray 6 to defined operating zones, and, if the calculated pickup ratio exceeds a limit for an operating zone based, at least in part, on the temperature measured for tray 6, set the pickup ratio to match the limit of the operating zone.

In an aspect, the data store includes instructions configured to direct the processor to ramp the set point for the PID flow controller on the lean solvent stream.

In an aspect, the data store includes instructions configured to direct the processor to determine if any instruments are providing bad readings and calculate a set point for the PID flow controller. In an aspect, the data store includes instructions configured to direct the processor to determine which instruments are providing valid measurements and predict a set point for the PID flow controller based, at least in part, on the valid measurements.

In an aspect, the control system includes an acid gas analyzer on an outlet stream from the contactor.

Another embodiment described herein provides a natural gas liquids (NGL) plant. The NGL plant includes an amine adsorption system, including a contactor to remove acid gases from a sour gas feed, and a stripper to remove acid gases from a rich solvent from the contactor to form a lean solvent. The NGL plant also includes a lean solvent line from the stripper to the contactor, a flow control valve on the lean solvent line, and a PID flow controller to control the flow control valve. The NGL plant also includes a temperature sensor to measure a temperature of a lower tray in the contactor, a flow sensor to measure a flow rate of a sour gas feed stream to the contactor, and an acid gas analyzer on the sour gas feed stream to the contactor. The NGL plant also includes a controller, that includes a sensor interface to obtain measurements from the flow sensor and the acid gas analyzer on the sour gas feed stream. The controller also includes a controller interface to communicate set points to the PID flow controller on the lean solvent stream to the contactor, a processor configured to execute stored instructions, and a data store, including instructions configured to direct the processor to read measurements from the temperature sensor, the flow sensor, and the acid gas analyzer on the sour gas feed stream. The data store also includes instructions configured to direct the processor to calculate a pickup ratio for the amine in the amine stripper, adjust the pickup ratio based, at least in part, on the temperature measured for the lower tray, and generate a set point for the PID flow controller on the lean solvent stream to the contactor, based, at least in part, on the pickup ratio.

In an aspect, the NGL plant includes an acid gas analyzer on a gas outlet from the contactor and the data store, which includes instructions configured to direct the processor to read measurements from the acid gas analyzer on the gas outlet from the contactor.

Other embodiments are also within the scope of the following claims.

What is claimed is:

1. A method for controlling a contactor, comprising:
   determining a pickup ratio for a solvent in the contactor;
   measuring a temperature of a lower tray of the contactor;
   adjusting the pickup ratio based, at least in part, on the temperature; and
   adjusting a flow rate for an injection of lean solvent into the contactor based, at least in part, on the pickup ratio.
2. The method of claim 1, comprising:
   measuring a concentration of acid gas at an inlet to the contactor; and
   measuring a concentration of the acid gas at an outlet from the contactor.

3. The method of claim 1, comprising:
defining four operating regions for the temperature; and
adjusting the pickup ratio based on a limit of an operating region.

4. The method of claim 3, comprising defining the four operating regions to be at a temperature of less than 155° F., at a temperature greater than 155° F., at a temperature of greater than 160° F., and at a temperature of greater than 175° F.

5. The method of claim 3, comprising setting the pickup ratio to a limiting value of the operating region if the temperature is outside of an operating region.

6. The method of claim 1, comprising ramping the flow rate to a new set point at a rate of 50 gallon per minute.

7. The method of claim 6, comprising providing the new set point to a proportional-integral-derivative (PID) controller for the flow rate for the injection of lean solvent.

8. The method of claim 1, comprising:
determining that an instrument is providing faulty readings; and
calculating a predicted set point for the flow rate based, at least in part, on operational instrumentation.

9. The method of claim 8, comprising switching between a local set point and a remote set point based, at least in part, on a detection of instrument failures.

* * * * *